US012749512B2

(12) United States Patent
Huan et al.

(10) Patent No.: US 12,749,512 B2
(45) Date of Patent: Sep. 29, 2026

(54) METHOD, DEVICE, STORAGE MEDIUM AND PROGRAM PRODUCT FOR PLAYING A VIDEO STREAM

(71) Applicant: Beijing Zitiao Network Technology Co., Ltd., Beijing (CN)

(72) Inventors: Rusong Huan, Beijing (CN); Xingyu Zhou, Beijing (CN); Zhixin Gao, Beijing (CN); Xin Guan, Beijing (CN); Jingying Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 58 days.

(21) Appl. No.: 19/100,327

(22) PCT Filed: Nov. 15, 2023

(86) PCT No.: PCT/CN2023/131881

§ 371 (c)(1), (2) Date: Jan. 31, 2025

(87) PCT Pub. No.: WO2024/114390

PCT Pub. Date: Jun. 6, 2024

(65) Prior Publication Data

US 2026/0120724 A1 Apr. 30, 2026

(30) Foreign Application Priority Data

Nov. 30, 2022 (CN) ........................ 202211529445.X

(51) Int. Cl.

*G11B 27/36* (2006.01)
*H04N 21/4402* (2011.01)
*H04N 21/442* (2011.01)

(52) U.S. Cl.

CPC ..... *G11B 27/36* (2013.01); *H04N 21/440263* (2013.01); *H04N 21/442* (2013.01)

(58) Field of Classification Search

CPC ........... G11B 27/36; H04N 21/440263; H04N 21/442

See application file for complete search history.

(56) References Cited

U.S. PATENT DOCUMENTS 9,819,978 B2 * 11/2017 Park ................. H04N 21/44209
2012/0307882 A1 * 12/2012 Ballocca ............. H04N 21/435 375/E7.026

(Continued)

FOREIGN PATENT DOCUMENTS

CN 102421021 A 4/2012
CN 102595204 A 7/2012

(Continued)

*Primary Examiner* — Mishawn N. Hunter
(74) *Attorney, Agent, or Firm* — Alleman Hall LLP

(57) ABSTRACT

Embodiments of the disclosure provide a method, a device, a storage medium and a program product for playing a video stream. The method includes: detecting whether a playback display state of a video stream is changed; in response to the playback display state of the video stream being changed, determining whether a preset definition switching condition is satisfied; and in accordance with a determination that the preset definition switching condition is satisfied, acquiring the video stream with a switched definition, and playing the video stream with the switched definition. According to embodiments of the present disclosure, by switching to an appropriate definition, the stuttering in the process of playing a video stream is reduced, the bandwidth cost is reasonably used, and the viewing experience of the video stream is guaranteed.

20 Claims, 3 Drawing Sheets

(56) References Cited

U.S. PATENT DOCUMENTS

| | | | | |
|---|---|---|---|---|
| 2016/0198214 | A1* | 7/2016 | Levy | H04N 21/64322 725/43 |
| 2017/0302990 | A1* | 10/2017 | Ying | H04L 65/764 |
| 2018/0324480 | A1* | 11/2018 | Schoen | H04N 21/6125 |
| 2024/0137617 | A1* | 4/2024 | Chen | H04N 21/4316 |
| 2024/0314373 | A1* | 9/2024 | Mirecki | H04N 21/2365 |

FOREIGN PATENT DOCUMENTS

| | | | |
|---|---|---|---|
| CN | 105025316 | A | 11/2015 |
| CN | 106162232 | A | 11/2016 |
| CN | 110602425 | A | 12/2019 |
| CN | 109982159 | B | 10/2021 |
| CN | 113596584 | A | 11/2021 |
| CN | 114827725 | A | 7/2022 |

* cited by examiner

METHOD, DEVICE, STORAGE MEDIUM AND PROGRAM PRODUCT FOR PLAYING A VIDEO STREAM

CROSS-REFERENCE TO RELATED APPLICATION

This application claims priority to Chinese Patent Application No. 202211529445X, filed with the Chinese Patent Office on Nov. 30, 2022 and entitled "METHOD, DEVICE, STORAGE MEDIUM AND PROGRAM PRODUCT FOR PLAYING A VIDEO STREAM", which is incorporated herein by reference in its entirety.

FIELD

Embodiments of the present disclosure relate to the field of computer and network communications technologies, and in particular, to a method and a device, a storage medium, and a program product for playing a video stream.

BACKGROUND

As the live streaming formats and gameplays increases, there are more and more resolution formats for live streaming video. Currently, a considerable portion of the live streaming video is landscape video streams (with a video width being larger than a video height).

However, a terminal screen such as a mobile phone is usually used in a portrait (a screen width is smaller than a screen height) state, which results in that the display area of a landscape video stream on a terminal used in a portrait state is relatively small, and, the terminal usually plays the landscape video stream with default definition in both the landscape state and the portrait state. As a result, there may be certain waste of traffic, and problems such as video stuttering may exist, thereby affecting viewing experience of a video stream.

SUMMARY

Embodiments of the present disclosure provide a method, a device, a storage medium, and a program product for playing a video stream. The method includes: smoothly switching a definition according to a change in a playback display state of a video stream, so that the video stuttering in the process of playing a video stream is reduced, the bandwidth cost is reasonably used, and the viewing experience of the video stream is guaranteed.

According to a first aspect, an embodiment of the present disclosure provides a method for playing a video stream, including:

- detecting whether a playback display state of a video stream is changed;
- in response to the playback display state of the video stream being changed, determining whether a preset definition switching condition is satisfied; and
- in accordance with a determination that the preset definition switching condition is satisfied, acquiring the video stream with a switched definition, and playing the video stream with the switched definition.

According to a second aspect, an embodiment of the present disclosure provides a for playing a video stream, including:

- a state determination unit configured to detect whether a playback display state of a video stream is changed;
- a condition determination unit configured to determine whether a preset definition switching condition is satisfied in response to the playback display state of the video stream being changed; and
- a switching unit configured to acquire the video stream with a switched definition and playing the video stream with the switched definition, in accordance with a determination that the preset definition switching condition is satisfied.

According to a third aspect, an embodiment of the present disclosure provides an electronic device, including: at least one processor and a memory;

- the memory stores computer executable instructions;
- the at least one processor executes computer executable instructions stored in the memory, so that the at least one processor executes the method for playing a video stream according to the foregoing first aspect and various possible designs of the first aspect.

According to a fourth aspect, an embodiment of the present disclosure provides a computer readable storage medium. The computer readable storage medium stores computer executable instructions. When a processor executes the computer executable instructions, the method for playing a video stream according to the first aspect and various possible designs of the first aspect is implemented.

According to a fifth aspect, an embodiment of the present disclosure provides a computer program product. The computer program product includes computer executable instructions. When a processor executes the computer executable instructions, the method for playing a video stream according to the foregoing first aspect and various possible designs of the first aspect is implemented.

The embodiments of the present disclosure provide a method, a device, a storage medium and a program product for playing a video stream. The method includes: detecting whether a playback display state for a video stream is changed; in response to the playback display state of the video stream being changed, determining whether a preset definition switching condition is satisfied; and in accordance with a determination that the preset definition switching condition is satisfied, acquiring the video stream with a switched definition, and playing the video stream with the switched definition. According to the embodiments of the present disclosure, by switching to an appropriate definition, video stuttering in the process of playing a video stream is reduced, the bandwidth cost is reasonably used, and the viewing experience of the video stream is guaranteed.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description are some embodiments of the present disclosure. For those skilled in the art, other drawings may also be obtained according to these drawings without creative efforts.

DETAILED DESCRIPTION

Figure 1:
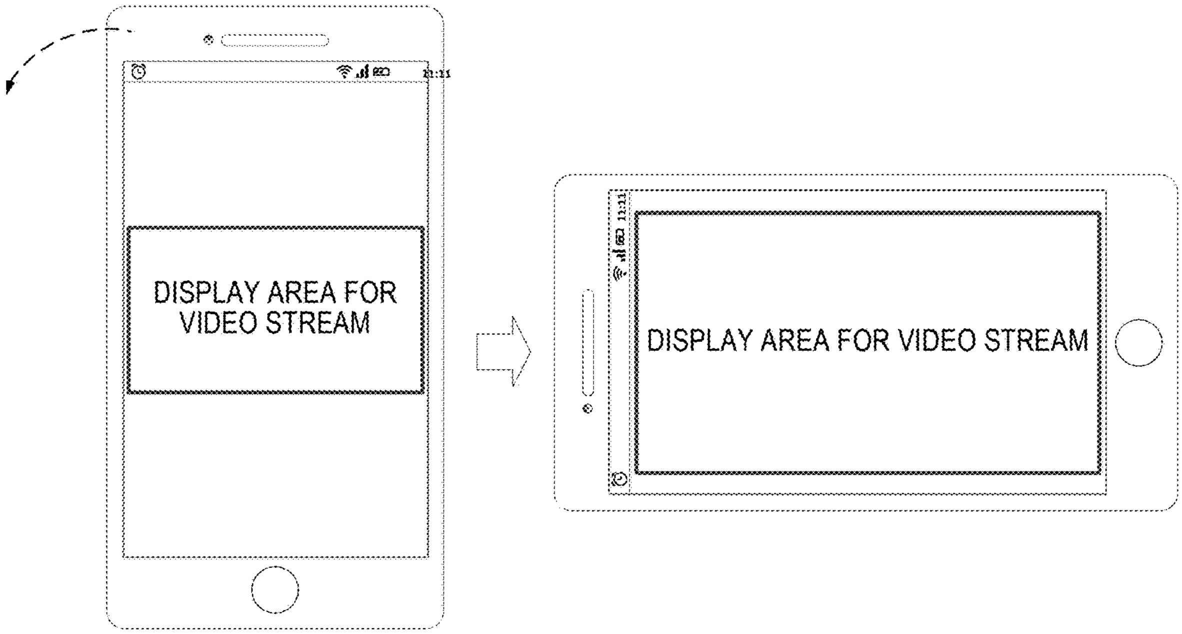
FIG. 1 is an exemplary diagram of an application scenario of a method for playing a video stream according to an embodiment of the present disclosure.

In order to make objects, technical solutions and advantages of the embodiments of the present disclosure clearer, the technical solutions in the embodiments of the present disclosure will be described below in a clearly and fully understandable way in connection with the drawings related to the embodiments of the present disclosure. Obviously, the described embodiments are only a part but not all of the embodiments of the present disclosure. All other embodiments obtained by persons of ordinary skill in the art based on the embodiments of the present disclosure without creative efforts shall belong to the scope of protection of the present disclosure.

As the live streaming formats and gameplays increases, there are more and more resolution formats for live streaming video. Currently, a considerable portion of the live streaming video is landscape video streams (with a video width being larger than a video height).

However, a terminal screen such as a mobile phone is usually used in a portrait (a screen width is smaller than a screen height) state, which results in that the display area of a landscape video stream on a terminal used in a portrait state is relatively small, and, the terminal usually plays the landscape video stream with default definition in both the landscape state and the portrait state. As a result, there may be certain waste of traffic, and problems such as video stuttering may exist, thereby affecting viewing experience of a video stream.

In order to solve the described technical problem, the present disclosure considers that a display area of a video stream occupies only a part of a terminal interface when the video stream is played in a non-full screen manner (including playing in a floating window); in this case, it is not sensitive to the magnitude of the resolution. Playing the video stream at a high resolution does not significantly improve the sense of view compared to playing the video stream at a low resolution, therefore, when the video stream is not played in full screen, the video stream may be played at a low resolution (for example, a first resolution). In this way, waste of traffic can be avoided, and a video stuttering can be avoided. A high resolution (for example, a second resolution) can be used when the video stream is played in a full screen. The second resolution is higher than the first resolution. The non-full screen playback of the video stream may include playing a landscape video stream when the terminal is in a portrait state, and may also include playing a portrait video stream when the terminal is in a landscape state. However, for a live video stream, the non-full screen playback of the video stream includes playing a landscape video stream when the terminal is in a portrait state.

On this basis, it is necessary to automatically switch resolutions according to a landscape or portrait state of a terminal and a landscape or portrait state of a video stream, without a manual operation by a user. However, the existing resolution adjustment method is generally simple, which may be summarized as the following three directions:

A method for dynamically adjusting definition based on state of network: a network is dynamically changed constantly, and when it is detected that the network becomes poor, the definition is dynamically reduced so as to achieve the purpose of smooth playback. However, this method cannot reduce downlink bandwidth according to requirements of different service modes without affecting watching experience to the greatest extent, so as to achieve the purpose of saving costs.

A method for dynamically adjusting definition based on a performance load: the performance of a terminal is dynamically changed constantly, and when it is detected that the performance becomes poor, the definition is dynamically reduced so as to achieve the purpose of viewing a stream smoothly. The method also does not reduce the downlink bandwidth according to requirements of service modes without affecting watching experience to the greatest extent, so as to achieve the purpose of saving costs.

Delivering different definitions based on size of the video content: definitions are assigned according to the resolution of the source video. Due to an excessively high downlink code rate, user experience is affected, and traffic is also unnecessarily wasted.

The prior art cannot be applied to automatic switching of a resolution according to a landscape or portrait state of a terminal and a landscape or portrait state of a video stream, and therefore, the present disclosure provides a method for playing a video stream, which detects whether a playback display state for a video stream is changed; in response to the playback display state of the video stream being changed, determines whether a preset definition switching condition is satisfied; and in accordance with a determination that the preset definition switching condition is satisfied, acquires the video stream with a switched definition, and plays the video stream with a switched definition. According to the embodiments of the present disclosure, by switching to an appropriate definition, the stuttering in the process of playing a video stream is reduced, the bandwidth cost is reasonably used, and the viewing experience of the video stream is guaranteed.

The method for playing a video stream according to the present disclosure is applicable to an application scenario shown in FIG. 1, and the terminal may be a mobile phone or another electronic device. It may be detected whether a playback display state of a video stream is changed, for example, on the left side of FIG. 1, the terminal is in a portrait state and plays a landscape video stream in a non-full screen manner, and when the terminal rotates in the direction indicated by the arrow, the terminal is switched from the portrait state to the landscape state as shown at the right side of FIG. 1, the video stream is also switched from non-full screen playback to full screen playback, and thus the definition needs to be increased; if the playback display state of the video stream is changed, whether the terminal satisfies a preset definition switching condition is determined; and if it is determined that the preset definition switching condition is satisfied, the video stream with a switched definition is acquired, and the video stream with the switched definition is played.

It should be noted that, the user information (including but not limited to a landscape or portrait state of a user terminal device, a network state, a device performance state, and so on) and data (including but not limited to data used for analysis, stored data, displayed data, and so on) involved in the present disclosure are information and data which are authorized by a user or sufficiently authorized by each party; collection, use and processing of relevant data need to comply with relevant legal regulations and standards of relevant countries and regions; and a corresponding operation entry is provided for the user to select authorization or rejection.

In addition, a definition automatic switching control can be displayed. A user can select whether to trigger the definition automatic switching control. After the definition automatic switching control is triggered, the method for playing a video stream provided by each embodiment of the present disclosure can be executed.

The method for playing a video stream according to the present disclosure will be described in detail below with reference to specific embodiments.

Figure 2:
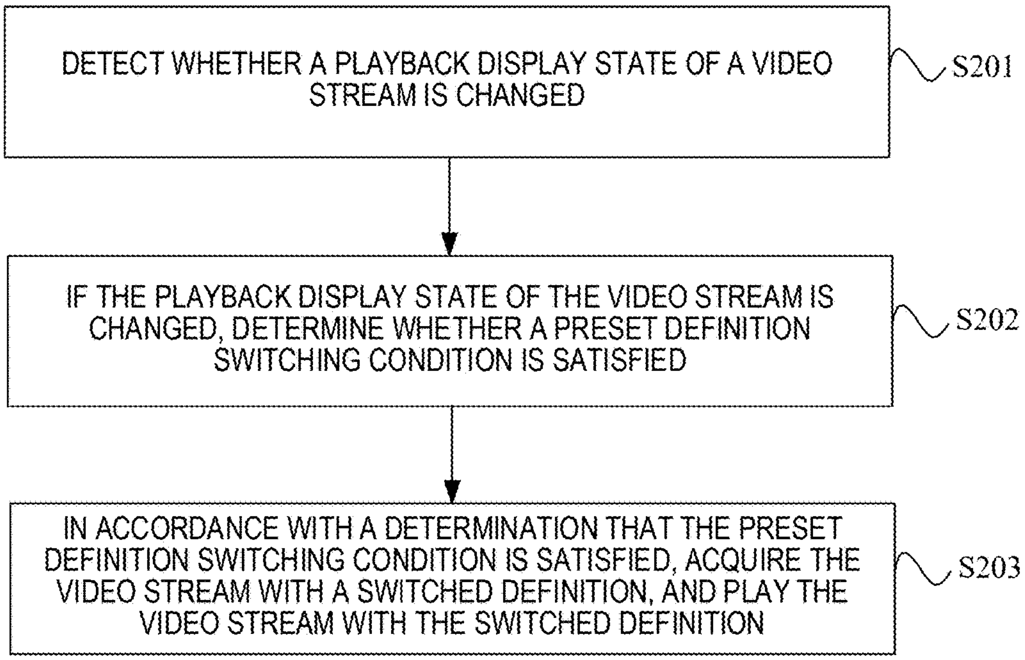
FIG. 2 is a schematic flowchart of a method for playing a video stream according to an embodiment of the present disclosure.

Referring to FIG. 2, FIG. 2 is a schematic flowchart of a method for playing a video stream according to an embodiment of the present disclosure. The method in this embodiment may be applied to a terminal device, and the method for playing a video stream includes the following.

At step 201, it is detected whether a playback display state of a video stream is changed.

In this embodiment, video streams may be divided into landscape video streams and portrait video streams, where a video width of a landscape video stream is greater than a video height thereof (the aspect ratio is greater than 1, such as 2:1, 4:3 and 16:9), and a video height of a portrait video stream is greater than a video width thereof (the aspect ratio is less than 1, such as 1:2, 3:4 and 9:16).

The change of the playback display state of the video stream includes switching between the non-full screen playback and the full screen playback. The landscape video stream can be played in full screen in a landscape state of the terminal, but cannot be played in full screen in a portrait state of the terminal, and a display area of the landscape video stream only occupies a part of the terminal interface, and a black screen or other contents are displayed above and/or below the display area of the landscape video stream; likewise, a portrait video stream can be played in a full screen state in a portrait state of the terminal, but cannot be played in a full screen state in a landscape state of the terminal, a display area of the portrait video stream only occupies a part of an interface of the terminal, and a black screen or other contents are displayed on the left and/or right of the display area of the portrait video stream.

It should be noted that, in a live streaming scenario, when a terminal is in a portrait state, a portrait video stream may be played in full screen, and a landscape video stream may also be played in non-full screen; when the terminal is in a landscape state, a landscape video stream can be played in full screen, and with regard to a portrait video stream, the portrait video stream is rotated by 90° to be played in a full screen manner. At this time, a user can rotate the terminal, switch the terminal from the landscape state to the portrait state, and view the portrait video in a full screen in the portrait state.

In addition, the video stream may also be played by using a floating window, which also belongs to a form of non-full-screen playback, and switching between the floating window playback and the full-screen playback also belongs to the playback display state of the video stream being changed. In addition, the size of the playback interface of the floating window can be adjusted, and the size of the playback interface being changed also belongs to the playback display state of the video stream being changed.

In this embodiment, whether the playback display state of the video stream is switched between the non-full screen playback and the full screen playback or whether the size of the playback interface of the video stream is changed may be detected, so as to determine whether the playback display state of the video stream is changed.

Detecting whether the playback display state of the video stream is switched between the non-full screen playback and the full screen playback may include first determining a landscape or portrait state of a terminal and a landscape or portrait state of the video stream; and determining, according to the landscape or portrait state of the terminal and the landscape or portrait state of the video stream, whether the playback display state of the video stream is switched between the non-full screen playback and full screen playback. Details about how to determine the landscape or portrait state of the terminal and the landscape or portrait state of the video stream are not described herein again.

In this embodiment, it is considered that, when the video stream is not played in the full screen, the display area of the video stream occupies only a part of the terminal interface; in this case, it is not sensitive to the magnitude of the resolution. Playing the video stream at a high resolution does not significantly improve the sense of view compared to playing the video stream at a low resolution, therefore, when the video stream is not played in full screen, the video stream may be played at a low resolution (for example, a first resolution). In this way, waste of traffic can be avoided, and a video stuttering can be avoided. A high resolution (for example, a second resolution) can be used when the video stream is played in a full screen. The second resolution is higher than the first resolution. The non-full screen playback of the video stream may include playing a landscape video stream when the terminal is in a portrait state, and may also include playing a portrait video stream when the terminal is in a landscape state. However, for a live video stream, the non-full screen playback of the video stream includes playing a landscape video stream or playing a video stream in a floating window.

In this embodiment, for the same video stream, the landscape or portrait state of the video stream generally remain unchanged, but the landscape or portrait state of the terminal may be determined by the user, especially, when the user changes the direction of the terminal, the landscape or portrait state of the terminal will change, resulting in that the playback of the video stream is switched between non-full screen playback and full-screen playback. In order to make the definition of the video stream adapt to the non-full screen playback and full screen playback of the video stream, and adapt to the landscape or portrait state of the terminal, it may be determined, according to the landscape or portrait state of the terminal and the landscape or portrait state of the video stream, whether the playback of the video stream by the terminal switches between non-full screen playback and full screen, so as to determine whether the definition of the video stream needs to be switched. Especially in the case that the video stream is not played in full screen at a relatively low-definition rate, change of the landscape or portrait state of the terminal will cause the video stream being played in full screen. In this case, it is determined that the definition of the video stream needs to be increased. For example, the definition is increased from an originally lower first resolution to a higher second resolution. Likewise, in a case that the video stream is played in full screen at a high-definition rate, change of the landscape or portrait state of the terminal will cause the video stream being played in the non-full screen. In this case, it is determined that the definition of the video stream needs to be reduced, for example, the definition is reduced from an originally higher second resolution to a lower first resolution.

Likewise, when the size of the playback interface of the video stream is larger, the video stream is played at a high resolution; and when the size of the playback interface of the video stream is smaller, the video stream is played at a low resolution. It can be determined according to the change in the size of the playback interface whether the definition needs to be switched, for example, when the floating window is used for playback, the video stream can be played at a high resolution when the floating window is large in size (for example, the first size), and the video stream can be played at a low resolution when the floating window is relatively small in size (for example, a second size, and the second size being less than the first size).

At S202, if the playback display state of the video stream is changed, it is determined whether a preset definition switching condition is satisfied.

In this embodiment, if the playback display state of the video stream is changed, it may be determined that the definition of the video stream needs to be switched, but the condition required for definition switching may not be satisfied, especially when a video stream is switched from a low definition to a high definition, more network resources and device resources need to be occupied. Therefore, it is also necessary to determine whether the terminal satisfies a preset definition switching condition, where the preset definition switching condition includes, but is not limited to, a network condition, terminal device performance, etc., and switching of definition can be continued only when the preset definition switching condition is satisfied; otherwise the switching of definition may be stopped, and the video stream continues to be played with the original definition.

At S203, in accordance with a determination that the preset definition switching condition is satisfied, the video stream with a switched definition is acquired, and the video stream with the switched definition is played.

In this embodiment, after determining that the terminal satisfies the preset definition switching condition, the terminal may switch the definition of the video stream, request the server for video stream data (the address of the video stream needed to be switched) according to the switched definition, and continue play the video stream with the switched definition. The definition switching process for the video stream is not repeated herein.

It should be noted that switching the video stream between full-screen playback and non-full screen playback is not affected, regardless of whether the switching of definition is performed.

According to the method for playing a video stream provided in this embodiment, it is detected whether the playback display state of the video stream is changed; if the playback display state of the video stream is changed, it is determined whether a preset definition switching condition is satisfied; if it is determined that the pre-set definition switching condition is satisfied, the video stream with a switched definition is acquired, and the video stream with the switched definition is played. In this embodiment, smooth switching of definition can be automatically implemented according to a change in the playback display state of the video stream; and by switching to a proper definition, the video stuttering in the process of playing a video stream is reduced, the bandwidth cost is reasonably used, and the viewing experience of the video stream is guaranteed.

On the basis of any of the foregoing embodiments, when determining whether the definition of the video stream needs to be switched, the method includes the following. When switching from the non-full screen playback to the full screen playback, the definition of the video stream needs to be increased, and when switching from the full screen playback to the non-full screen playback, the definition of the video stream needs to be reduced. In the following description, it is assumed that the definition of the video stream needs to be increased when it is switched from the non-full screen playback to the full screen playback.

In an embodiment, if the video stream is a landscape video stream and the terminal is switched from a portrait state to a landscape state, the video stream is switched from non-full screen playback to full-screen playback, and it is determined that the definition of the video stream needs to be increased. Of course, in other embodiments, for a non-live video stream, if the video stream is a portrait video stream and the terminal is switched from the landscape state to the portrait state, the video stream is also switched from the non-full screen playback to the full screen playback, and it is determined that the definition of the video stream needs to be increased. The video stream is switched from floating window playback to full-screen playback, which also belongs to switching from the non-full screen playback to the full screen playback, and it is determined that the definition of the video stream needs to be increased.

On the basis of the foregoing embodiment, determining whether the terminal satisfies the preset definition switching condition at S202 may specifically include:

determining whether a network state of a terminal satisfies a preset network condition; and/or determining whether a performance state of the terminal satisfies a preset performance condition.

In this embodiment, a network state of a terminal may be acquired, in which the network state of the terminal can be a real-time network state, such as a current uplink and downlink rate, and it may also be a network state in a past period of time, such as a comprehensive determination on uplink and downlink rates of all data in the past period of time. In addition, a preset uplink and downlink rate can be used as the preset network condition, and the uplink and downlink rate is directly compared with the preset uplink and downlink rate so as to determine whether the network state of the terminal satisfies a preset network condition; or the network states of the terminal may be divided into different grades (for example, a first grade, a second grade, etc., in which the first grade is superior to the second grade), and if the current network state of the terminal belongs to some grade (for example, the first grade), it is determined that the network state of the terminal satisfies the pre-set network condition.

In addition, in this embodiment, the performance state of the terminal may also be acquired, in which the performance state of the terminal is used for reflecting the magnitude of the load of the terminal, and it may be any parameter capable of reflecting the magnitude of the load of the terminal. The performance state of the terminal may be a real-time performance state, and may also be a comprehensive determination on the performance state in a past period of time. In addition, a parameter value may be preset as a preset performance condition, and the parameter value for the performance state of the terminal is directly compared with the preset parameter value to determine whether the performance state of the terminal satisfies the preset performance condition. The performance states of the terminal may also be divided into different grades (for example, being divided into a first grade and a second grade according to the performance load, in which the first grade is superior to the second grade), and if the current performance state of the terminal belongs to some grade (for example, the first grade), it is determined that the performance state of the terminal satisfies a preset performance condition.

By determining the network state and/or the performance state of a terminal, differentiated definition control and switching based on a landscape or portrait change, a network condition and a performance change of the terminal can be realized. It should be noted that the determination on the preset definition switching condition may not be performed when the definition of the video stream needs to be reduced.

Figure 3:
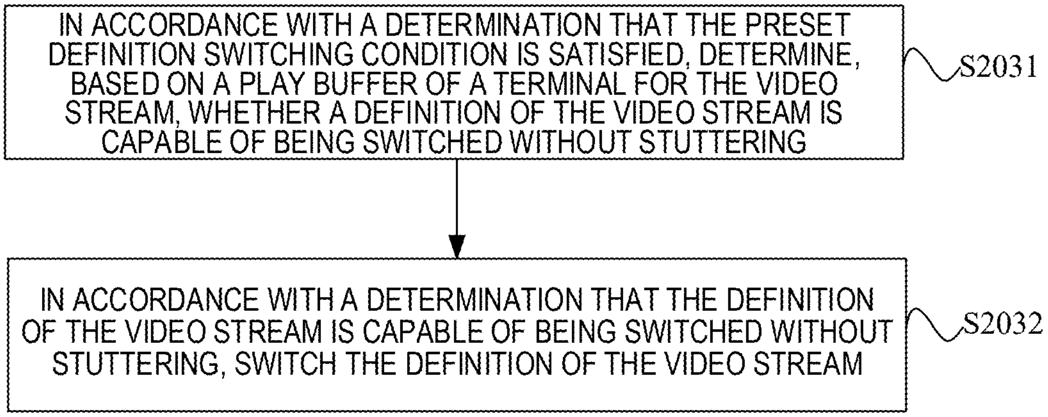
FIG. 3 is a schematic flowchart of a method for playing a video stream according to another embodiment of the present disclosure.

On the basis of the described embodiments, after it is determined that the terminal satisfies the preset definition switching condition, if the terminal cannot smoothly switch the definition, especially if stuttering occurs when the definition is switched, the definition of the video stream is not switched, that is, the video stream is continuously played at the original definition. The definition is switched only on the premise that no stuttering occurs in switching of the definition. Therefore, as shown in FIG. 3, after it is determined that the terminal satisfies the preset definition switching condition, the step S203 of switching the definition of the video stream may specifically include:

At S2031, if it is determined that the preset definition switching condition is satisfied, it is determined, according to a play buffer of the terminal for the video stream, whether the definition of the video stream is capable of being switched without stuttering.

At S2032, if it is determined that the definition of the video stream is capable of being switched without stuttering, the definition of the video stream is switched.

In this embodiment, after it is determined that the terminal satisfies the preset definition switching condition, before the definition of the video stream is actually switched, it can be determined whether the definition of the video stream can be switched without stuttering. Considering that after switching of the video stream, a series of operations need to be performed at the switched definition, such as requesting video stream data (which requires the address of the switched video stream) and decoding the video stream data, which takes a certain amount of time, thus the video stream may continuously be played in the original definition during this period of time, until the video stream with the switched definition can be played normally and then joined seamlessly, so that the stuttering can be avoided when switching the definition. Therefore, the terminal needs to have sufficient play buffer for the video stream with original definition, so as to ensure that there is a sufficient length of the video stream with the original definition being used as buffer in the switching process. Therefore, in this embodiment, it may be determined, according to a play buffer of the terminal for the video stream, whether the definition of the video stream is capable of being switched without stuttering, that is, whether the terminal has sufficient play buffer for the video stream with the original definition, so as to ensure that there is a sufficient length of the video stream with the original definition being used as a buffer in the switching process. The play buffer of the video stream may be determined by the terminal according to the buffer.

Specifically, a current play buffer data volume of the terminal for the video stream at a current definition (original definition) is determined; and a target play buffer data volume of the video stream is determined, where the target play buffer data volume is a data volume capable of ensuring that there is a sufficient length of the video stream with the original definition being used as a buffer in the switching process, Furthermore, the current play buffer data volume can be compared with the target play buffer data volume, and if the current play buffer data volume is greater than or equal to the target play buffer data volume, it indicates that there is a sufficient length of play buffer for the video stream with the original definition of the terminal, ensuring that there is a sufficient length of the video stream with the original definition being used as a buffer in the switching process. In this way, it is determined that the definition of the video stream can be switched without stuttering.

Further, the terminal marks the current play buffer data volume for the video stream at the current definition (original definition) as PlayBuffer; determines a target play buffer data volume of the video stream, including determining the target play buffer data volume of the video stream according to a video average video bit rate of the video stream and a preset buffer duration, specifically as follows:

acquiring a product of a video average bit rate Bit Rate of the video stream and a preset buffer duration N (how long the video stream data is currently buffered, in which the unit may be seconds), and determining the product as the target play buffer data volume N*Bit Rate of the video stream.

If PlayBuffer>=N*BitRate, it is determined that the definition of the video stream can be switched without stuttering, and the switching of definition can be continued.

Of course, if it is determined that the current play buffer data volume is continuously less than the target play buffer data volume for a preset duration (for example, 5 seconds), it is determined that the definition of the video stream cannot be switched without stuttering, and switching of the definition of the video stream is stopped. That is, in the present embodiment, the judgment decision in this embodiment as to whether or not it is possible to switch the definition without stuttering is kept within a preset duration at most, and when the preset duration expires, if the current play buffer data volume has not yet reached the target play buffer data volume, the switching of definition of the video stream is stopped, and the video stream continues to be played at the original definition.

Figure 4:
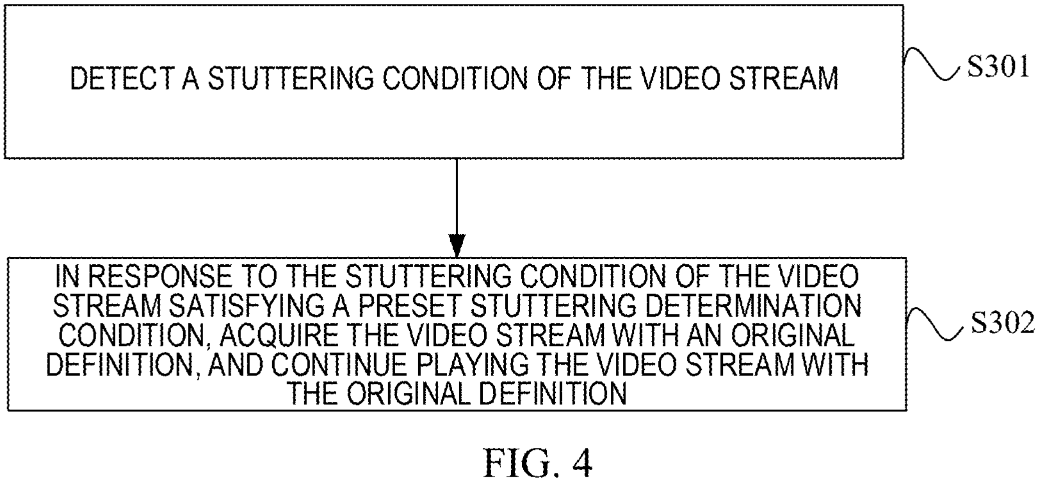
FIG. 4 is a schematic flowchart of a method for playing a video stream according to another embodiment of the present disclosure.

On the basis of any one of the foregoing embodiments, as shown in FIG. 4, after S203 of acquiring the video stream with the switched definition and playing the video stream with the switched definition, the method can further include:

At S301, a stuttering condition of the video stream is detected; and

At S302, if the stuttering condition of the video stream satisfies a preset stuttering determination condition, the video stream with the original definition is acquired, and the video stream with the original definition is continuously played.

In this embodiment, the stuttering condition or smoothness of the video stream may also be continuously detected after the definition of the video stream is switched. When the stuttering condition of the video stream satisfies a preset stuttering determination condition, for example, the accumulated stuttering time reaches M seconds within N seconds during the playback, the video stream needs to be switched back to the original definition, and the video stream is continuously played at the original definition, thereby ensuring the fluency of the playback of the video stream.

Figure 5:
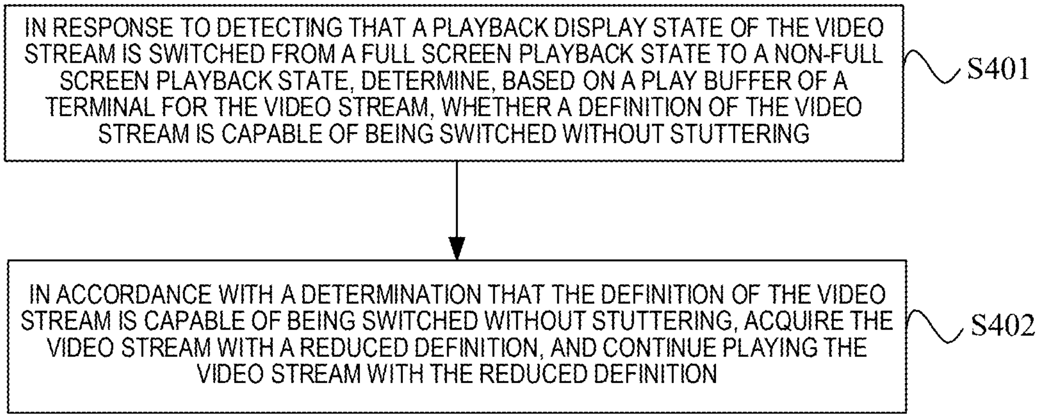
FIG. 5 is a schematic flowchart of a method for playing a video stream according to another embodiment of the present disclosure.

On the basis of any one of the foregoing embodiments, as shown in FIG. 5, after S203 of acquiring the video stream with the switched definition and playing the video stream with the switched definition, the method may further include:

At S401, if it is detected that the playback display state of the video stream is switched from the full screen playback state to the non-full screen playback state, it is determined, according to the play buffer of the terminal for the video stream, whether the definition of the video stream is capable of being switched without stuttering; and At step S402, if it is determined that the video stream is capable of switching the definition without the stuttering, the video stream with a reduced definition is acquired, and the video stream with the reduced definition is continuously played.

In this embodiment, after the definition of the video stream is switched, if it is determined that the video stream is switched from the full screen playback to the non-full screen playback, for example, in this embodiment, for a landscape video stream, when the terminal is switched from the landscape state to the portrait state, it is determined that the definition of the video stream needs to be reduced (for a portrait video stream of a non-live video stream, it may be determined that the definition of the video stream needs to be reduced when the terminal is switched from the portrait state to the landscape state, or it may be determined that the definition of the video stream needs to be reduced when the live stream is switched from the full screen state to the floating window state, or it may also be determined that the definition of the video stream needs to be reduced when the playback interface of the live stream is switched from a large size to a small size). Switching the video stream from high definition to low definition generally does not occupy more network resources and device resources, therefore, determination on whether the terminal satisfies the preset definition switching condition may not be performed, and whether the definition of the video stream can be switched without stuttering may be directly determined according to the play buffer of the terminal for the video stream. For the determination process, reference may be made to the foregoing embodiment. After it is determined that the definition of the video stream can be switched without the stuttering, the definition of the video stream is reduced, and the video stream is continuously played on the terminal in the reduced definition.

Figure 6:
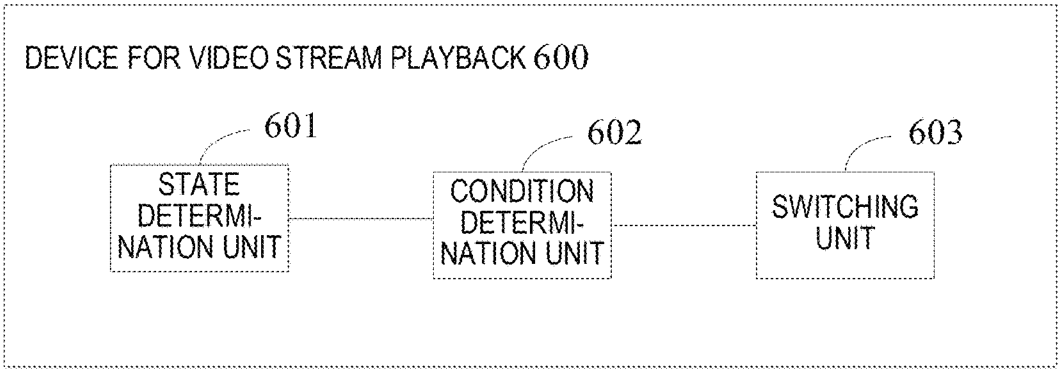
FIG. 6 is a structural block diagram of a device for playing a video stream according to an embodiment of the present disclosure.

Corresponding to the method for playing a video stream in the foregoing embodiments, FIG. 6 is a structural block diagram of a device for playing a video stream according to an embodiment of the present disclosure. For ease of description, only parts related to the embodiments of the present disclosure are shown. Referring to FIG. 6, the device for playing a video stream 600 includes a state determination unit 601, a condition determination unit 602, and a switching unit 603.

The state determination unit 601 is configured to detect whether a playback display state of a video stream is changed.

The condition determination unit 602 is configured to determine whether a preset definition switching condition is satisfied in response to the playback display state of the video stream being changed.

The switching unit 603 is configured to acquire the video stream with a switched definition and playing the video stream with the switched definition, in accordance with a determination that the preset definition switching condition is satisfied.

In one or more embodiments of the present disclosure, when detecting whether the playback display state of the video stream is changed, the state determination unit 601 is configured to:

detect whether the playback display state of the video stream is switched between a non-full screen playback and a full screen playback, or detect whether a size of a playback interface of the video stream is changed.

In one or more embodiments of the present disclosure, when detecting whether the playback display state of the video stream is switched between the non-full screen playback and the full screen playback, the state determination unit 601 is configured to:

determine a landscape or portrait state of a terminal and a landscape or portrait state of the video stream; and determine, according to the landscape or portrait state of the terminal and the landscape or portrait state of the video stream, whether the playback display state of the video stream is switched between the non-full screen playback and full screen playback.

In one or more embodiments of the present disclosure, when determining, according to the landscape or portrait state of the terminal and the landscape or portrait state of the video stream, whether the playback display state of the video stream is switched between the non-full screen playback and full screen playback, the state determination unit 601 is configured to:

in response the video stream being a landscape video stream and the terminal being switched from a portrait state to a landscape state, determine that the video stream is switched from the non-full screen playback to the full screen playback, and the definition of the video stream needs to be increased.

In one or more embodiments of the present disclosure, the condition determination unit 602 is configured:

determine whether a network state of a terminal satisfies a preset network condition; and/or determine whether a performance state of the terminal satisfies a preset performance condition.

In one or more embodiments of the present disclosure, if it is determined that the preset definition switching condition is satisfied, the condition determination unit 602 is further configured to determine, according to a play buffer of the terminal for the video stream, whether the definition of the video stream is capable of being switched without stuttering;

In accordance with a determination that the definition of the video stream is capable of being switched without stuttering, the switching unit 603 switches the definition of the video stream.

In one or more embodiments of the present disclosure, when the condition determination unit 602 determines, according to the play buffer of the terminal for the video stream, whether the definition of the video stream is capable of being switched without stuttering, the condition determination unit 602 is configured to:

determine a current play buffer data volume of the terminal for the video stream at a current definition;

determine a target play buffer data volume of the video stream;

compare the current play buffer data volume with the target play buffer data volume, and in response to the current play buffer data volume being greater than or equal to the target play buffer data volume, determine that the definition of the video stream is capable of being switched without stuttering.

In one or more embodiments of the present disclosure, when determining the target volume of the play buffer of the video stream, the condition determination unit 602 is configured to:

determining the target play buffer data volume of the video stream according to a video average bit rate of the video stream and a preset buffer duration.

In one or more embodiments of the present disclosure, when determining, according to the play buffer of the terminal for the video stream, whether the definition of the video stream is capable of being switched without stuttering, the condition determination unit 602 is further configured to:

in accordance with a determination that the current play buffer data volume is continuously less than the target play buffer data volume within a preset duration, determine that the definition of the video stream is not capable of being switched without stuttering, and the switching unit 603 stops performing switching of definition on the video stream.

In one or more embodiments of the present disclosure, after acquiring the video stream with the switched definition, and playing the video stream with the switched definition, the switching unit 603 is further configured to:

detect a stuttering condition of the video stream; and in response to the stuttering condition of the video stream satisfying a preset stuttering determination condition, acquire the video stream with an original definition, and continuously play the video stream with the original definition.

In one or more embodiments of the present disclosure, after acquiring the video stream with the switched definition, and playing the video stream with the switched definition, the condition determination unit 602 is further configured to determine, according to a play buffer of the terminal for the video stream, whether a definition of the video stream is capable of being switched without stuttering, in response to detecting that the playback display state of the video stream is switched from a full screen playback state to a non-full screen playback state.

The switching unit 603 is further configured to acquire the video stream with a reduced definition after determining that the definition of the video stream is capable of being switched without stuttering, and continuously play the video stream with the reduced definition.

The device provided in this embodiment may be used to execute the technical solutions of the foregoing method embodiments, and implementation principles and technical effects of the device are similar, and are not repeatedly described herein in this embodiment.

Figure 7:
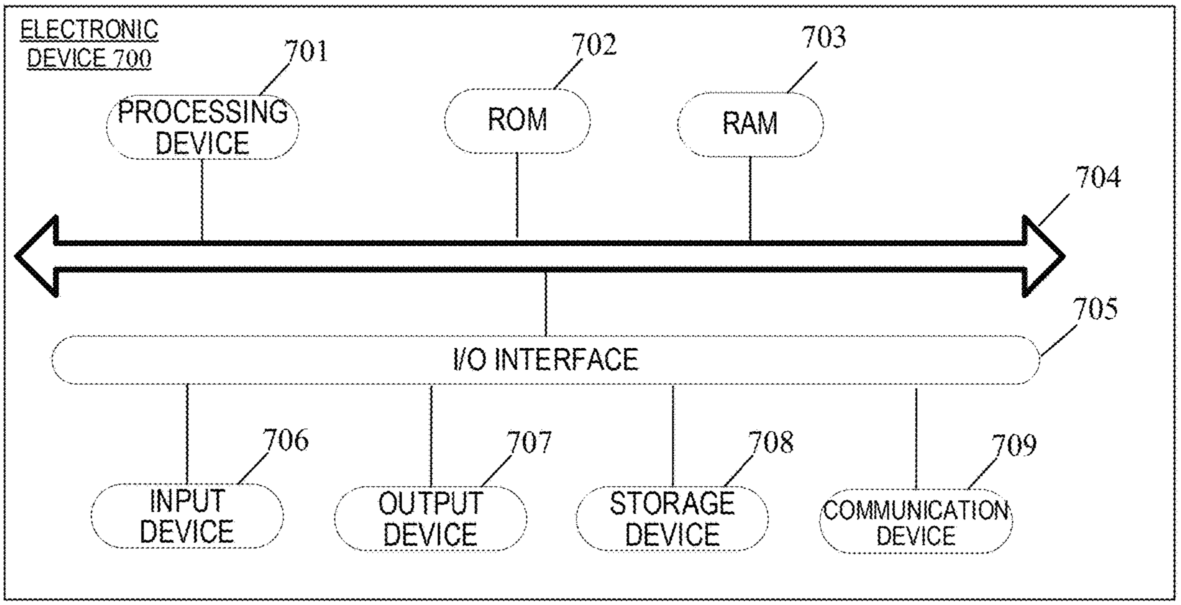
FIG. 7 is a schematic structural diagram of hardware of an electronic device according to an embodiment of the present disclosure.

Referring to FIG. 7, a schematic structural diagram of an electronic device 700 suitable for implementing an embodiment of the present disclosure is shown. The electronic device 700 may be a terminal device or a server. The terminal device may include, but is not limited to, but is not limited to, a mobile terminal such as a mobile phone, a laptop computer, a digital broadcast receiver, a personal digital assistant (Personal Digital Assistant, PDA for short), a tablet computer (Portable Android Device, PAD for short), a portable multimedia player (Portable Media Player, PMP for short), a vehicle-mounted terminal (for example, a vehicle-mounted navigation terminal), and the like, and a fixed terminal such as a digital TV, a desktop computer, and the like. The electronic device shown in FIG. 7 is merely an example and should not bring any limitation to the functions and scope of use of the embodiments of the present disclosure.

As shown in FIG. 7, the electronic device 700 may include a processing device (e.g., central processing unit, graphics processor, etc.) 701 that may perform various suitable actions and processes in accordance with a program stored in a read only memory (ROM) 702 or a program loaded into a random-access memory (RAM) 703 from a storage device 708. In the RAM 703, various programs, and data necessary for the operation of the electronic device 700 are also stored. The processing devices 701, the ROM 702, and the RAM 703 are connected to each other via a bus 704. An input/output (I/O) interface 705 is also connected to the bus 704.

In general, the following devices may be connected to the I/O interface 705: an input device 706 including, for example, a touch screen, touch pad, keyboard, mouse, camera, microphone, accelerometer, gyroscope, or the like; an output device 707 including, for example, a liquid crystal display (LCD), a speaker, a vibrator, or the like; a storage device 708 including, for example, a magnetic tape, a hard disk, or the like; and a communication device 709. The communication device 709 may allow the electronic device 700 to communicate wirelessly or with other devices to exchange data. While FIG. 7 illustrates the electronic device 700 with a variety of devices, it should be understood that it is not required that all of the illustrated devices be implemented or provided. More or fewer devices may alternatively be implemented or provided.

In particular, the processes described above with reference to the flowcharts can be implemented as computer software programs, in accordance with embodiments of the present disclosure. For example, embodiments of the present disclosure include a computer program product including a computer program carried on a computer readable medium. The computer program includes a program code for executing the method as shown in the flowchart. In such an embodiment, the computer program may be downloaded and installed from the network via communications device 709, installed from storage 708, or installed from ROM 702. When the computer program is executed by the processing device 701, the above-described functions defined in the method according to the embodiment of the present disclosure are executed.

It should be noted that the computer readable medium in the present disclosure may be a computer readable signal medium or a computer readable storage medium, or any combination thereof. A computer-readable storage medium may be, for example, but not limited to, an electronic, magnetic, optical, electromagnetic, infrared, or semiconductor system, apparatus, or device, or any suitable combination of the foregoing. More specific examples of the computer readable storage medium may include, but are not limited to, an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain or store a program for use by or in connection with an instruction execution system, apparatus, or device. While in the present disclosure, a computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may also be any computer readable medium (other than the computer readable storage medium) that can communicate, propagate, or transport a program for use by or in connection with an instruction execution system, apparatus, or device. Program code embodied on a computer readable medium may be transmitted using any appropriate medium, including, but not limited to, wireline, optical fiber cable, RF (radio frequency), etc., or any suitable combination of the foregoing.

The computer readable medium may be included in the electronic device, or may exist separately and not be installed in the electronic device.

The computer readable medium carries one or more programs thereon, and when the one or more programs are executed by the electronic device, the electronic device is enabled to execute the method shown in the foregoing embodiments.

Computer program codes for performing the operations of the present disclosure may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in a certain case, for example, a first acquiring unit may also be described as "a unit for acquiring at least two internet protocol addresses".

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to a first aspect, according to one or more embodiments of the present disclosure, a method for playing a video stream is provided, including:

detecting whether a playback display state of a video stream is changed;

in response to the playback display state of the video stream being changed, determining whether a preset definition switching condition is satisfied; and in accordance with a determination that the preset definition switching condition is satisfied, acquiring the video stream with a switched definition, and playing the video stream with the switched definition.

According to one or more embodiments of the present disclosure, detecting whether the playback display state of the video stream is changed includes:

detecting whether the playback display state of the video stream is switched between a non-full screen playback and a full screen playback, or detecting whether a size of a playback interface of the video stream is changed.

According to one or more embodiments of the present disclosure, detecting whether the playback display state of the video stream is switched between the non-full screen playback and the full screen playback includes:

determining a landscape or portrait state of a terminal and a landscape or portrait state of the video stream; and determining, according to the landscape or portrait state of the terminal and the landscape or portrait state of the video stream, whether the playback display state of the video stream is switched between the non-full screen playback and full screen playback.

According to one or more embodiments of the present disclosure, determining, according to the landscape or portrait state of the terminal and the landscape or portrait state of the video stream, whether the playback display state of the video stream is switched between the non-full screen playback and full screen playback includes:

in response the video stream being a landscape video stream and the terminal being switched from a portrait state to a landscape state, determining that the video stream is switched from the non-full screen playback to the full screen playback, and the definition of the video stream needs to be increased.

According to one or more embodiments of the present disclosure, determining whether the preset definition switching condition is satisfied includes:

determining whether a network state of a terminal satisfies a preset network condition; and/or determining whether a performance state of the terminal satisfies a preset performance condition.

According to one or more embodiments of the present disclosure, switching a definition of the video stream in accordance with a determination that the preset definition switching condition is satisfied includes:

in accordance with a determination that the preset definition switching condition is satisfied, determining, according to a play buffer of the terminal for the video stream, whether the definition of the video stream is capable of being switched without stuttering; and in accordance with a determination that the definition of the video stream is capable of being switched without stuttering, switching the definition of the video stream.

According to one or more embodiments of the present disclosure, determining, according to the play buffer of the terminal for the video stream, whether the definition of the video stream is capable of being switched without stuttering includes:

determining a current play buffer data volume of the terminal for the video stream at a current definition;

determining a target play buffer data volume for the video stream; and comparing the current play buffer data volume with the target play buffer data volume, and in response to the current play buffer data volume being greater than or equal to the target play buffer data volume, determining that the definition of the video stream is capable of being switched without stuttering.

According to one or more embodiments of the present disclosure, determining the target play buffer data volume of the video stream includes:

determining the target play buffer data volume of the video stream according to a video average bit rate of the video stream and a preset buffer duration.

According to one or more embodiments of the present disclosure, determining, according to the play buffer of the terminal for the video stream, whether the definition of the video stream is capable of being switched without stuttering further includes:

in accordance with a determination that the current play buffer data volume is continuously less than the target play buffer data volume within a preset duration, determine that the definition of the video stream is not capable of being switched without stuttering, and stopping performing switching of definition on the video stream.

According to one or more embodiments of the present disclosure, the method further includes, after acquiring the video stream with the switched definition, and playing the video stream with the switched definition:

detecting a stuttering condition of the video stream; and in response to the stuttering condition of the video stream satisfying a preset stuttering determination condition, acquiring the video stream with an original definition, and continue playing the video stream with the original definition.

According to one or more embodiments of the present disclosure, the method further includes, after acquiring the video stream with the switched definition, and playing the video stream with the switched definition:

in response to detecting that the playback display state of the video stream is switched from a full screen playback state to a non-full screen playback state, determining, according to a play buffer of the terminal for the video stream, whether a definition of the video stream is capable of being switched without stuttering; and in accordance with a determination that the definition of the video stream is capable of being switched without stuttering, acquiring the video stream with a reduced definition, and continue playing the video stream with the reduced definition.

According to a second aspect, in one or more embodiments of the present disclosure, a device for playing a video stream is provided, including:

a state determination unit configured to detect whether a playback display state of a video stream is changed;

a condition determination unit configured to determine whether a preset definition switching condition is satisfied in response to the playback display state of the video stream being changed; and a switching unit configured to acquire the video stream with a switched definition and playing the video stream with the switched definition, in accordance with a determination that the preset definition switching condition is satisfied.

According to one or more embodiments of the present disclosure, when the state determination unit detects whether the playback display state of the video stream is changed, the state determination unit is configured to:

detect whether the playback display state of the video stream is switched between a non-full screen playback and a full screen playback, or detecting whether a size of a playback interface of the video stream is changed.

According to one or more embodiments of the present disclosure, when detecting whether the playback display state of the video stream is switched between the non-full screen playback and the full screen playback, the state determination unit is configured to:

determine a landscape or portrait state of a terminal and a landscape or portrait state of the video stream; and determine, according to the landscape or portrait state of the terminal and the landscape or portrait state of the video stream, whether the playback display state of the video stream is switched between the non-full screen playback and full screen playback.

According to one or more embodiments of the present disclosure, when determining, according to the landscape or portrait state of the terminal and the landscape or portrait state of the video stream, whether the playback display state of the video stream is switched between the non-full screen playback and full screen playback, the state determination unit is configured to:

in response the video stream being a landscape video stream and the terminal being switched from a portrait state to a landscape state, determine that the video stream is switched from the non-full screen playback to the full screen playback, and the definition of the video stream needs to be increased.

According to one or more embodiments of the present disclosure, when determining whether the preset definition switching condition is satisfied, the condition determination unit is configured to:

determine whether a network state of a terminal satisfies a preset network condition; and/or determine whether a performance state of the terminal satisfies a preset performance condition.

According to one or more embodiments of the present disclosure, if it is determined that the preset definition switching condition is satisfied, the condition determination unit is further configured to determine, according to a play buffer of the terminal for the video stream, whether the definition of the video stream is capable of being switched without stuttering; and if it is determined that the definition of the video stream is capable of being switched without stuttering, switching the definition of the video stream.

According to one or more embodiments of the present disclosure, when determining, according to the play buffer of the terminal for the video stream, whether the definition of the video stream is capable of being switched without stuttering, the condition determination unit is configured to:

determine a current play buffer data volume of the terminal for the video stream at a current definition;

determine a target play buffer data volume for the video stream; and compare the current play buffer data volume with the target play buffer data volume, and in response to the current play buffer data volume being greater than or equal to the target play buffer data volume, determine that the definition of the video stream is capable of being switched without stuttering.

According to one or more embodiments of the present disclosure, when determining the target play buffer data volume of the video stream, the condition determination unit is configured to:

determine the target play buffer data volume of the video stream according to a video average bit rate of the video stream and a preset buffer duration.

According to one or more embodiments of the present disclosure, when determining, according to the play buffer of the terminal for the video stream, whether the definition of the video stream is capable of being switched without stuttering, the condition determination unit is further configured to:

in accordance with a determination that the current play buffer data volume is continuously less than the target play buffer data volume within a preset duration, determine that the definition of the video stream is not capable of being switched without stuttering, and stopping performing switching of definition on the video stream.

According to one or more embodiments of the present disclosure, after acquiring the video stream with the switched definition, and playing the video stream with the switched definition, the switching unit is further configured to:

detect a stuttering condition of the video stream; and in response to the stuttering condition of the video stream satisfying a preset stuttering determination condition, acquire the video stream with an original definition, and continuously play the video stream with the original definition.

According to one or more embodiments of the present disclosure, the condition determination unit is further configured to, after acquiring the video stream with the switched definition, and playing the video stream with the switched definition, if it is detected that that the playback display state of the video stream is switched from a full screen playback state to a non-full screen playback state, determine, according to a play buffer of the terminal for the video stream, whether a definition of the video stream is capable of being switched without stuttering;

the switching unit is further configured to, in accordance with a determination that the definition of the video stream is capable of being switched without stuttering, acquire the video stream with a reduced definition, and continuously play the video stream with the reduced definition.

According to a third aspect, according to one or more embodiments of the present disclosure, there is provided an electronic device, including: at least one processor and a memory;

where, the memory stores computer executable instructions;

the at least one processor executes computer executable instructions stored in the memory, so that the at least one processor executes the method for playing a video stream according to the foregoing first aspect and various possible designs of the first aspect.

According to a fourth aspect, according to one or more embodiments of the present disclosure, a computer readable storage medium is provided. The computer readable storage medium stores computer executable instructions therein. When a processor executes the computer executable instructions, the method for playing a video stream according to the first aspect and various possible designs of the first aspect is implemented.

According to a fifth aspect, a computer program product is provided according to one or more embodiments of the present disclosure. The computer program product includes computer executable instructions. When a processor executes the computer executable instruction, the method for playing a video stream according to the first aspect and various possible designs of the first aspect is implemented.

The above description is only embodiments of this disclosure and an explanation of the technical principles used. Those skilled in the art should understand that the scope of the disclosure involved in this disclosure is not limited to technical solutions composed of specific combinations of the above technical features, but should also covers other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although a plurality of operations are depicted in a specific order, this should not be understood as requiring these operations to be performed in the specific order shown or in a sequential order. In certain environments, multitasking and parallel processing may be advantageous. Similarly, although a plurality of implementation details are included in the above discussion, these should not be construed as limiting the scope of the present disclosure. Some features described in the context of individual embodiments can also be implemented in combination in a single embodiment. Conversely, a plurality of features described in the context of a single embodiment can also be implemented in a plurality of embodiments separately or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely example forms of implementing the claims.

The invention claimed is:

1. A method for playing a video stream, comprising:

detecting whether a playback display state of a video stream is changed;

in response to the playback display state of the video stream being changed, determining whether a preset definition switching condition is satisfied; and in accordance with a determination that the preset definition switching condition is satisfied, acquiring the video stream with a switched definition, and playing the video stream with the switched definition.

2. The method according to claim 1, wherein detecting whether the playback display state of the video stream is changed comprises:

detecting whether the playback display state of the video stream is switched between a non-full screen playback and a full screen playback, or detecting whether a size of a playback interface of the video stream is changed.

3. The method according to claim 2, wherein detecting whether the playback display state of the video stream is switched between the non-full screen playback and the full screen playback comprises:

determining a landscape or portrait state of a terminal and a landscape or portrait state of the video stream; and determining, based on the landscape or portrait state of the terminal and the landscape or portrait state of the video stream, whether the playback display state of the video stream is switched between the non-full screen playback and full screen playback.

4. The method according to claim 3, wherein determining, based on the landscape or portrait state of the terminal and the landscape or portrait state of the video stream, whether the playback display state of the video stream is switched between the non-full screen playback and full screen playback comprises:

in response the video stream being a landscape video stream and the terminal being switched from a portrait state to a landscape state, determining that the video stream is switched from the non-full screen playback to the full screen playback, and the definition of the video stream needs to be increased.

5. The method according to claim 1, wherein determining whether the preset definition switching condition is satisfied comprises:

determining whether a network state of a terminal satisfies a preset network condition; and/or determining whether a performance state of the terminal satisfies a preset performance condition.

6. The method according to claim 5, wherein in accordance with a determination that the preset definition switching condition is satisfied, switching a definition of the video stream comprises:

in accordance with a determination that the preset definition switching condition is satisfied, determining, based on a play buffer of a terminal for the video stream, whether a definition of the video stream is capable of being switched without stuttering; and in accordance with a determination that the definition of the video stream is capable of being switched without stuttering, switching the definition of the video stream.

7. The method according to claim 6, wherein determining, based on the play buffer of the terminal for the video stream, whether the definition of the video stream is capable of being switched without stuttering comprises:

determining a current play buffer data volume of the terminal for the video stream at a current definition;

determining a target play buffer data volume for the video stream; and comparing the current play buffer data volume with the target play buffer data volume, and in response to the current play buffer data volume being greater than or equal to the target play buffer data volume, determining that the definition of the video stream is capable of being switched without stuttering.

8. The method according to claim 7, wherein determining the target play buffer data volume of the video stream comprises:

determining the target play buffer data volume of the video stream based on a video average bit rate of the video stream and a preset buffer duration.

9. The method according to claim 8, wherein determining, based on the play buffer of the terminal for the video stream, whether the definition of the video stream is capable of being switched without stuttering further comprises:

in accordance with a determination that the current play buffer data volume is continuously less than the target play buffer data volume within a preset duration, determining that the definition of the video stream is not capable of being switched without stuttering, and stopping performing switching of definition on the video stream.

10. The method according to claim 1, wherein after acquiring the video stream with the switched definition, and playing the video stream with the switched definition, the method further comprises:

detecting a stuttering condition of the video stream; and in response to the stuttering condition of the video stream satisfying a preset stuttering determination condition, acquiring the video stream with an original definition, and continue playing the video stream with the original definition.

11. The method according to claim 1, wherein after acquiring the video stream with the switched definition, and playing the video stream with the switched definition, the method further comprises:

in response to detecting that the playback display state of the video stream is switched from a full screen playback state to a non-full screen playback state, determining, based on a play buffer of the terminal for the video stream, whether a definition of the video stream is capable of being switched without stuttering; and in accordance with a determination that the definition of the video stream is capable of being switched without stuttering, acquiring the video stream with a reduced definition, and continue playing the video stream with the reduced definition.

12. An electronic device, comprising: at least one processor and a memory;

the memory storing computer executable instructions, the at least one processor executing computer executable instructions stored in the memory, so that the at least one processor executes a method comprising:

detecting whether a playback display state of a video stream is changed;

in response to the playback display state of the video stream being changed, determining whether a preset definition switching condition is satisfied; and in accordance with a determination that the preset definition switching condition is satisfied, acquiring the video stream with a switched definition, and playing the video stream with the switched definition.

13. The device according to claim 12, wherein detecting whether the playback display state of the video stream is changed comprises:

detecting whether the playback display state of the video stream is switched between a non-full screen playback and a full screen playback, or detecting whether a size of a playback interface of the video stream is changed.

14. The device according to claim 13, wherein detecting whether the playback display state of the video stream is switched between the non-full screen playback and the full screen playback comprises:

determining a landscape or portrait state of a terminal and a landscape or portrait state of the video stream; and determining, based on the landscape or portrait state of the terminal and the landscape or portrait state of the video stream, whether the playback display state of the video stream is switched between the non-full screen playback and full screen playback.

15. The device according to claim 14, wherein determining, based on the landscape or portrait state of the terminal and the landscape or portrait state of the video stream, whether the playback display state of the video stream is switched between the non-full screen playback and full screen playback comprises:

in response the video stream being a landscape video stream and the terminal being switched from a portrait state to a landscape state, determining that the video stream is switched from the non-full screen playback to the full screen playback, and the definition of the video stream needs to be increased.

16. The device according to claim 12, wherein determining whether the preset definition switching condition is satisfied comprises:

determining whether a network state of a terminal satisfies a preset network condition; and/or determining whether a performance state of the terminal satisfies a preset performance condition.

17. The device according to claim 16, wherein in accordance with a determination that the preset definition switching condition is satisfied, switching a definition of the video stream comprises:

in accordance with a determination that the preset definition switching condition is satisfied, determining, based on a play buffer of a terminal for the video stream, whether a definition of the video stream is capable of being switched without stuttering; and in accordance with a determination that the definition of the video stream is capable of being switched without stuttering, switching the definition of the video stream.

18. The device according to claim 17, wherein determining, based on the play buffer of the terminal for the video stream, whether the definition of the video stream is capable of being switched without stuttering comprises:

determining a current play buffer data volume of the terminal for the video stream at a current definition;

determining a target play buffer data volume for the video stream; and comparing the current play buffer data volume with the target play buffer data volume, and in response to the current play buffer data volume being greater than or equal to the target play buffer data volume, determining that the definition of the video stream is capable of being switched without stuttering.

19. The device according to claim 18, wherein determining the target play buffer data volume of the video stream comprises:

determining the target play buffer data volume of the video stream based on a video average bit rate of the video stream and a preset buffer duration.

20. A non-transitory computer readable storage medium, wherein the computer readable storage medium stores computer executable instructions therein, and when a processor executes the computer executable instructions, implementing a method comprising:

detecting whether a playback display state of a video stream is changed;

in response to the playback display state of the video stream being changed, determining whether a preset definition switching condition is satisfied; and in accordance with a determination that the preset definition switching condition is satisfied, acquiring the video stream with a switched definition, and playing the video stream with the switched definition.

* * * * *